US010536933B2

(12) United States Patent
Guo et al.

(10) Patent No.: US 10,536,933 B2
(45) Date of Patent: Jan. 14, 2020

(54) METHOD AND APPARATUS FOR ASSISTING DATA TRANSMISSION IN A WIRELESS COMMUNICATION SYSTEM

(71) Applicant: ASUSTeK Computer Inc., Taipei (TW)

(72) Inventors: Yu-Hsuan Guo, Taipei (TW); Meng-Hui Ou, Taipei (TW); Wei-Yu Chen, Taipei (TW); Li-Te Pan, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 15/454,559

(22) Filed: Mar. 9, 2017

(65) Prior Publication Data

US 2017/0265182 A1    Sep. 14, 2017

Related U.S. Application Data

(60) Provisional application No. 62/307,016, filed on Mar. 11, 2016.

(51) Int. Cl.
*H04W 72/12* (2009.01)
*H04W 72/04* (2009.01)
*H04W 88/08* (2009.01)

(52) U.S. Cl.
CPC ... *H04W 72/0413* (2013.01); *H04W 72/0446* (2013.01); *H04W 88/08* (2013.01)

(58) Field of Classification Search
None
See application file for complete search history.

(56) References Cited

U.S. PATENT DOCUMENTS

| 8,190,164 B2 | 5/2012 | So |
| 2008/0101286 A1* | 5/2008 | Wang ............... H04W 72/1268 370/329 |
| 2009/0070650 A1* | 3/2009 | Bourlas ............... H04L 1/1861 714/748 |
| 2011/0026467 A1 | 2/2011 | Wen et al. |

(Continued)

FOREIGN PATENT DOCUMENTS

| CN | 101132220 | 2/2008 |
| CN | 101647214 A | 2/2010 |

(Continued)

OTHER PUBLICATIONS

Office Action from corresponding TW Application No. 106107847, dated Dec. 28, 2017.

(Continued)

*Primary Examiner* — Ajit Patel
(74) *Attorney, Agent, or Firm* — Blue Capital Law Firm, P.C.

(57) ABSTRACT

A method and apparatus are disclosed for assisting data transmission in a wireless communication system. In one embodiment, the method includes a UE transmitting information to a base station, wherein the information at least indicates time to start an uplink transmission by the UE. In another embodiment, the method could include the UE receiving, from the base station, a configuration indicating a periodic uplink resource allocation. In addition, the method could include the UE performing the uplink transmission based on the periodic uplink resource allocation.

20 Claims, 18 Drawing Sheets

(56) References Cited

U.S. PATENT DOCUMENTS

| | | | |
|---|---|---|---|
| 2011/0116463 A1* | 5/2011 | Ishii | H04W 72/1289 370/329 |
| 2011/0194502 A1 | 8/2011 | Sung | |
| 2011/0223924 A1* | 9/2011 | Lohr | H04W 72/042 455/450 |
| 2015/0063191 A1* | 3/2015 | Merlin | H04L 47/12 370/312 |
| 2015/0063318 A1* | 3/2015 | Merlin | H04L 47/12 370/336 |
| 2015/0282148 A1* | 10/2015 | Le | H04W 72/0406 370/329 |
| 2015/0327245 A1 | 11/2015 | Zhu et al. | |
| 2016/0037322 A1* | 2/2016 | Nguyen | H04W 76/14 370/329 |
| 2017/0019914 A1* | 1/2017 | Rune | H04W 72/1268 |
| 2017/0150500 A1* | 5/2017 | Ahn | H04W 72/0446 |
| 2017/0208542 A1* | 7/2017 | Kim | H04W 52/02 |
| 2018/0013533 A1* | 1/2018 | Yang | H04W 72/0413 |

FOREIGN PATENT DOCUMENTS

| | | |
|---|---|---|
| CN | 103369509 A | 10/2013 |
| JP | 2016163213 A * | 9/2016 |
| WO | WO2015094033 A1 | 6/2015 |

OTHER PUBLICATIONS

European Search Report from corresponding EP Application No. 17160150.3, dated Aug. 7, 2017.
Office Action from Taiwan Intellectual Property Office in corresponding TW Application No. 106107847, dated May 23, 2018.
Office Action from corresponding KR Application No. 10-2017-0030147, dated Jun. 25, 2018.
Communication pursuant to Article 93(3) EPC in corresponding EP Application No. 17160150.3, dated Feb. 20, 2019.
Office Action from SIPO in corresponding SIPO Application No. 201710138938.3, dated Jun. 4, 2019.

* cited by examiner

METHOD AND APPARATUS FOR ASSISTING DATA TRANSMISSION IN A WIRELESS COMMUNICATION SYSTEM

CROSS-REFERENCE TO RELATED APPLICATIONS

The present application claims the benefit of U.S. Provisional Patent Application Ser. No. 62/307,016 filed on Mar. 11, 2016, the entire disclosure of which is incorporated herein in their entirety by reference.

FIELD

This disclosure generally relates to wireless communication networks, and more particularly, to a method and apparatus for assisting data transmission in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed for assisting data transmission in a wireless communication system. In one embodiment, the method includes a UE transmitting information to a base station, wherein the information at least indicates time to start an uplink transmission by the UE. In another embodiment, the method could include the UE receiving, from the base station, a configuration indicating a periodic uplink resource allocation. In addition, the method could include the UE performing the uplink transmission based on the periodic uplink resource allocation.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to the wireless technology discussed in various documents, including: "Requirements and Current Solutions of Wireless Communication in Industrial Automation", A. Frotzscher et al., IEEE ICC'14—W8: Workshop on 5G Technologies, 2014. Furthermore, the exemplary wireless communication systems devices described below may be designed to support one or more standards such as the standard offered by a consortium named "3rd Generation Partnership Project" referred to herein as 3GPP, including: SP-150142, "New WID Study on New Services and Markets Technology Enablers (FS_SMARTER)"; TR 22.891 v1.2.0, "Feasibility Study on New Services and Markets Technology Enablers; Stage 1 (Release 14)"; SP-150818, "New WID on Study on SMARTER Critical Communications (FS_SMARTER-CRIC)"; S1-154453, "Feasibility Study on New Services and Markets Technology Enablers Critical Communications; Stage 1 (Release 14)"; TS 36.321 v13.0.0, "E-UTRA MAC protocol specification"; TS 36.331 v13.0.0. "E-UTRA RRC protocol specification"; TS 23.401 v13.4.0, "GPRS enhancements for E-UTRAN access"; and TS 36.300 v13.1.0, "E-UTRA and E-UTRAN Overall description;

Stage 2". The standards and documents listed above are hereby expressly incorporated by reference in their entirety.

Figure 1:
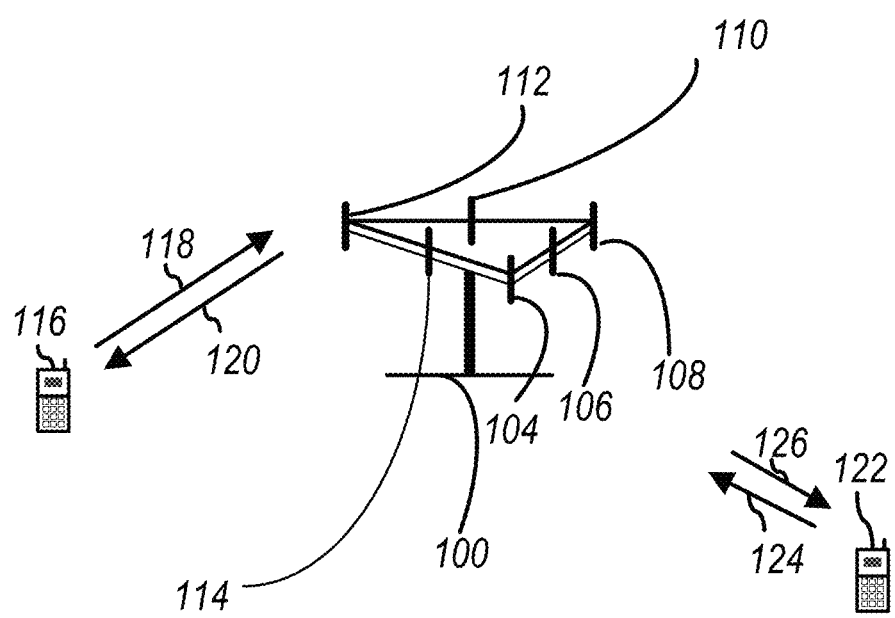
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a G Node B (gNB), a transmission/reception point (TRP), or some other terminology. An access terminal (AT) may also be called user equipment (UE), a wireless communication device, terminal, access terminal or some other terminology.

Figure 2:
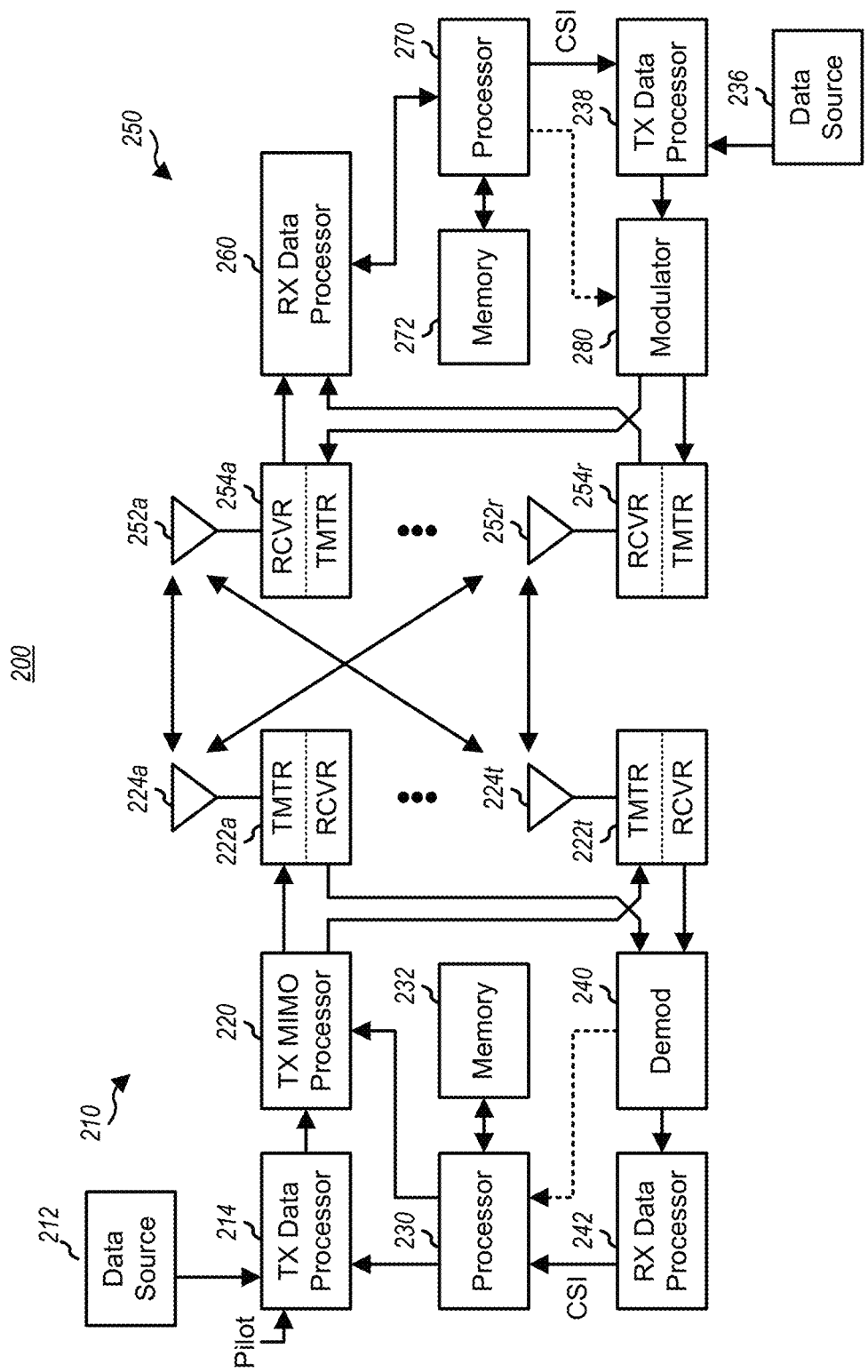
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
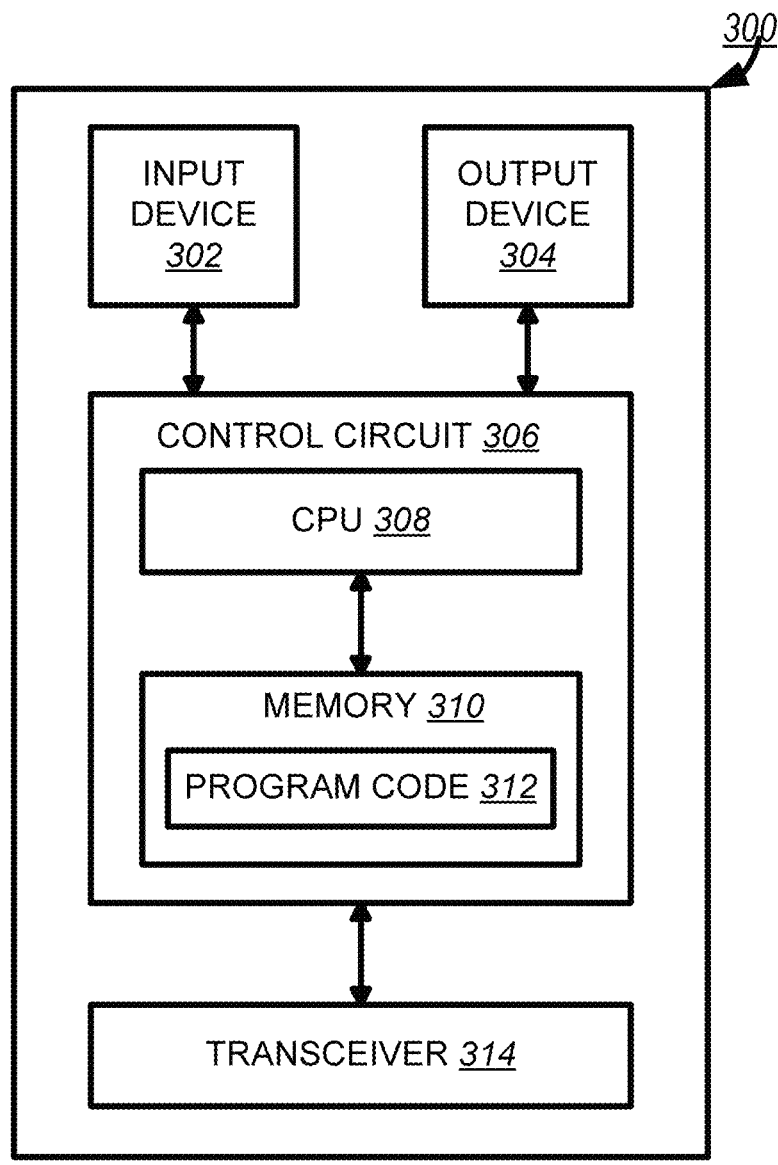
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
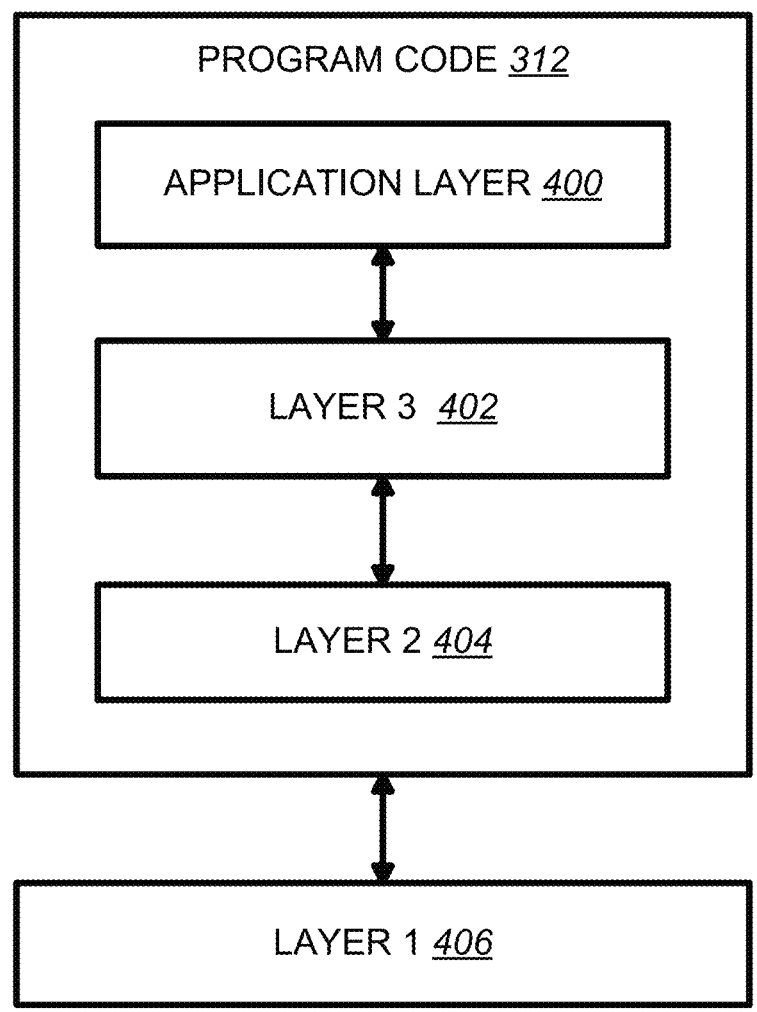
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

Study on next generation mobile communication system has been in progress in 3GPP. In 3GPP SA (Service and System Aspects), high-level use cases and the related high-level potential requirements are identified to enable 3GPP network operators to support the needs of new services and markets as discussed in 3GPP SP-150142. The outcome of the study is documented in 3GPP TR 22.891. During the study, critical communication has been identified as one important area where the 3GPP system needs to be enhanced as discussed in 3GPP SP-150818. The identified use case families in the area of critical communication generally include:

Higher reliability and lower latency
Higher reliability, higher availability and lower latency
Very low latency
Higher accuracy positioning In the family of higher reliability and lower latency, factory automation is one of the use cases. 3GPP S1-154453 provides the following description of the factory automation use case:

Factory automation requires communications for closed-loop control applications. Examples for such applications are robot manufacturing, round-table production, machine tools, packaging and printing machines. In these applications, a controller interacts with large number of sensors and actuators (up to 300), typically confined to a rather small manufacturing unit (e.g., 10 m×10 m×3 m). The resulting sensor/actuator density is often very high (up to $1/m^3$). Many of such manufacturing units may have to be supported within close proximity within a factory (e.g., up to 100 in assembly line production, car industry).

In the closed-loop control application, the controller periodically submits instructions to a set of sensor/actuator devices, which return a response within a cycle time. The messages, referred to as telegrams, typically have small size (<50 bytes). The cycle time ranges between 2 and 20 ms setting stringent latency constraints on to telegram forwarding (<1 ms to 10 ms). Additional constraints on isochronous telegram delivery add tight constraints on jitter (10-100 us). Transport is also subject to stringent reliability requirements measured by the fraction of events where the cycle time could not be met ($<10^{-9}$). In addition, sensor/actuator power consumption is often critical.

Traditionally closed-loop control applications rely on wired connections using proprietary or standardized field bus technologies. Often, sliding contacts or inductive mechanisms are used to interconnect to moving sensor/actuator devices (robot arms, printer heads, etc.). Further, the high spatial density of sensors poses challenges to wiring.

WSAN-FA, which has been derived from ABB's proprietary WISA technology and builds on top of 802.15.1 (Bluetooth), is a wireless air interface specification that is targeted at this use case. WSAN-FA claims to reliably meet latency targets below 10-15 ms with a residual error rate of <10-9. WSAN-FA uses the unlicensed ISM 2.4 band and is therefore vulnerable to in-band interference from other unlicensed technologies (WiFi, ZigBee, etc.).

To meet the stringent requirements of closed-loop factory automation, the following considerations may have to be taken:

Limitation to short range communications between controller and sensors/actuators.
Allocation of licensed spectrum for closed-loop control operations. Licensed spectrum may further be used as a complement to unlicensed spectrum, e.g., to enhance reliability.
Reservation of dedicated air-interface resources for each link.
Combining of multiple diversity techniques to approach the high reliability target within stringent latency constraints such as frequency, antenna, and various forms of spatial diversity, e.g., via relaying
Utilizing OTA time synchronization to satisfy jitter constraints for isochronous operation.
Network access security used in an industrial factory deployment is provided and managed by the factory owner with its ID management, authentication, confidentiality and integrity.

A typical industrial closed-loop control application is based on individual control events. Each closed-loop control event consists of a downlink transaction followed by an synchronous uplink transaction both of which are executed within a cycle time, Tcycle. Control events within a manufacturing unit may have to occur isochronously.

1. Controller requests from sensor to take a measurement (or from actuator to conduct actuation).
2. Sensor sends measurement information (or acknowledges actuation) to controller.

Figure 5:
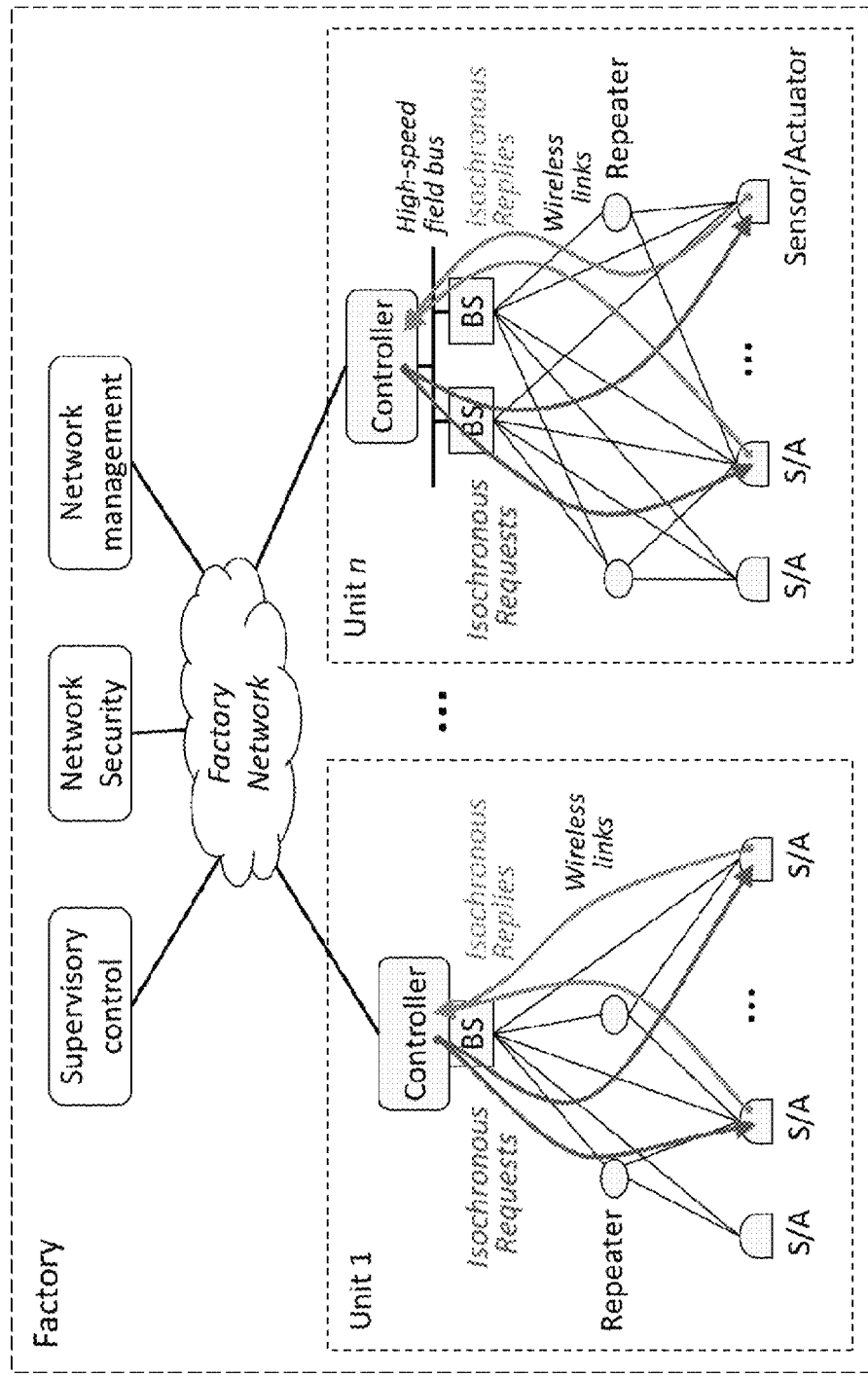
FIG. 5 is a reproduction of FIG. 5.1.2.1.1 of 3GPP S1-154453.

[FIG. 5.1.2.1.1 of 3GPP S1-154453 is reproduced as FIG. 5]

FIG. 5.1.2.1.1 depicts how communication will occur in factory automation. In this use case, communication is confined to local controller-to-sensor/actuator interaction within each manufacturing unit. Repeaters may provide spatial diversity to enhance reliability.

Figure 6:
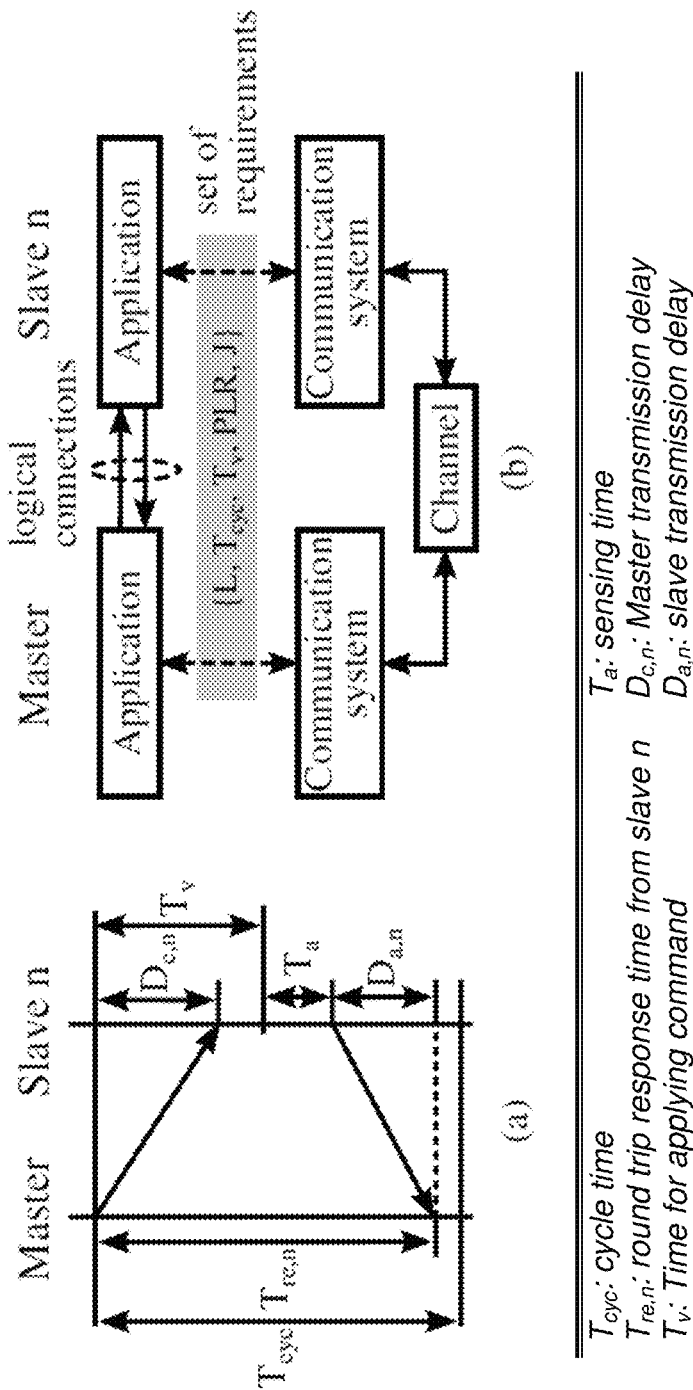
FIG. 6 is a reproduction of FIG. 2 of the IEEE paper entitled "Requirements and Current Solutions of Wireless Communication in Industrial Automation" by A. Frotzscher et al.

It is assumed that sensors/actuators will be started for production each day and sensors/actuators may take several minutes to be ready to start production. Furthermore, sensors/actuators need to be in connected mode to receive instructions and reply responses within cycle time limitation. Cycle time Tcyc is used as metric for latency, i.e., command and response should be executed in one cycle time shown in FIG. 6, which is a reproduction of FIG. 2 of the IEEE paper entitled "Requirements and Current Solutions of Wireless Communication in Industrial Automation" by A. Frotzscher et al.

Figure 7:
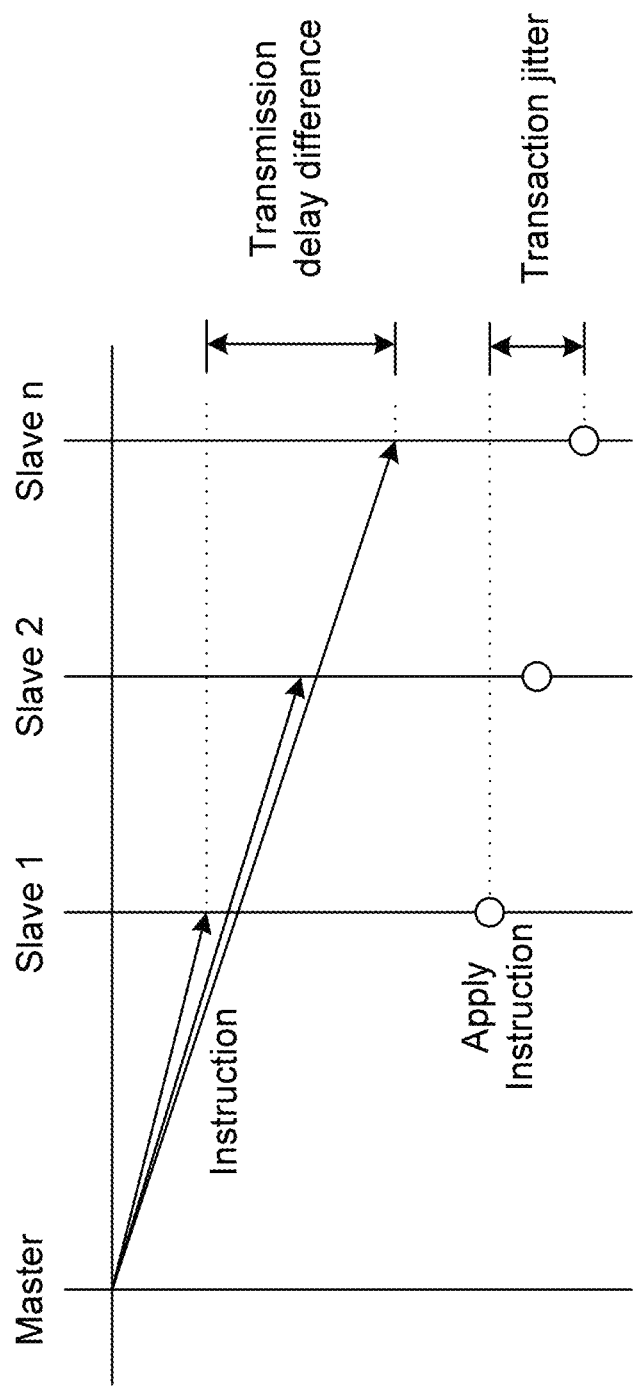
FIG. 7 is a diagram according to one exemplary embodiment.

After receiving the instructions, sensors/actuators within the same manufacturing unit must apply instructions to operate isochronously that are constrained by jitter. Transaction jitter, as shown in FIG. 7, is generally caused by the difference of DL (Downlink) time synchronization between different UEs.

In summary, the transaction model can be assumed as follows:

Controller transmits instruction(s) to sensors/actuators via base station during Dc,n. Diversity technique (e.g., retransmission of the instructions by base station) may also occur during Dc,n.

Sensors/actuators apply instruction(s) at the end of Tv.

Sensors/actuators transmit responses to the controller via base station during Da,n. Diversity technique (e.g., retransmission of the responses) may also occur during Da,n.

A sensor or an actuator may act as a UE in a mobile communication network. The sensors and/or actuators that have similar or related tasks may be grouped together as a set of UEs.

After a set of UEs have done the initial attach and registration, and have successfully received necessary parameters, a controller in factory network periodically transmits broadcast, multicast, or unicast instruction (50~100 bytes) to the set of UEs (e.g., sensor/actuator devices). These UEs return a response (e.g., measurement or acknowledgement) within a cycle time (1~2 ms). The probability that cycle time could not be met should be <$10^{-9}$. Furthermore, these UEs have to apply the instruction received in the same cycle time isochronously (jitter <10 us).

The cycle time requirement mentioned above is critical and needs to be fulfilled in order to achieve factory automation in a wireless communication system. A mechanism to fulfill the cycle time requirement needs to be considered.

Figure 8:
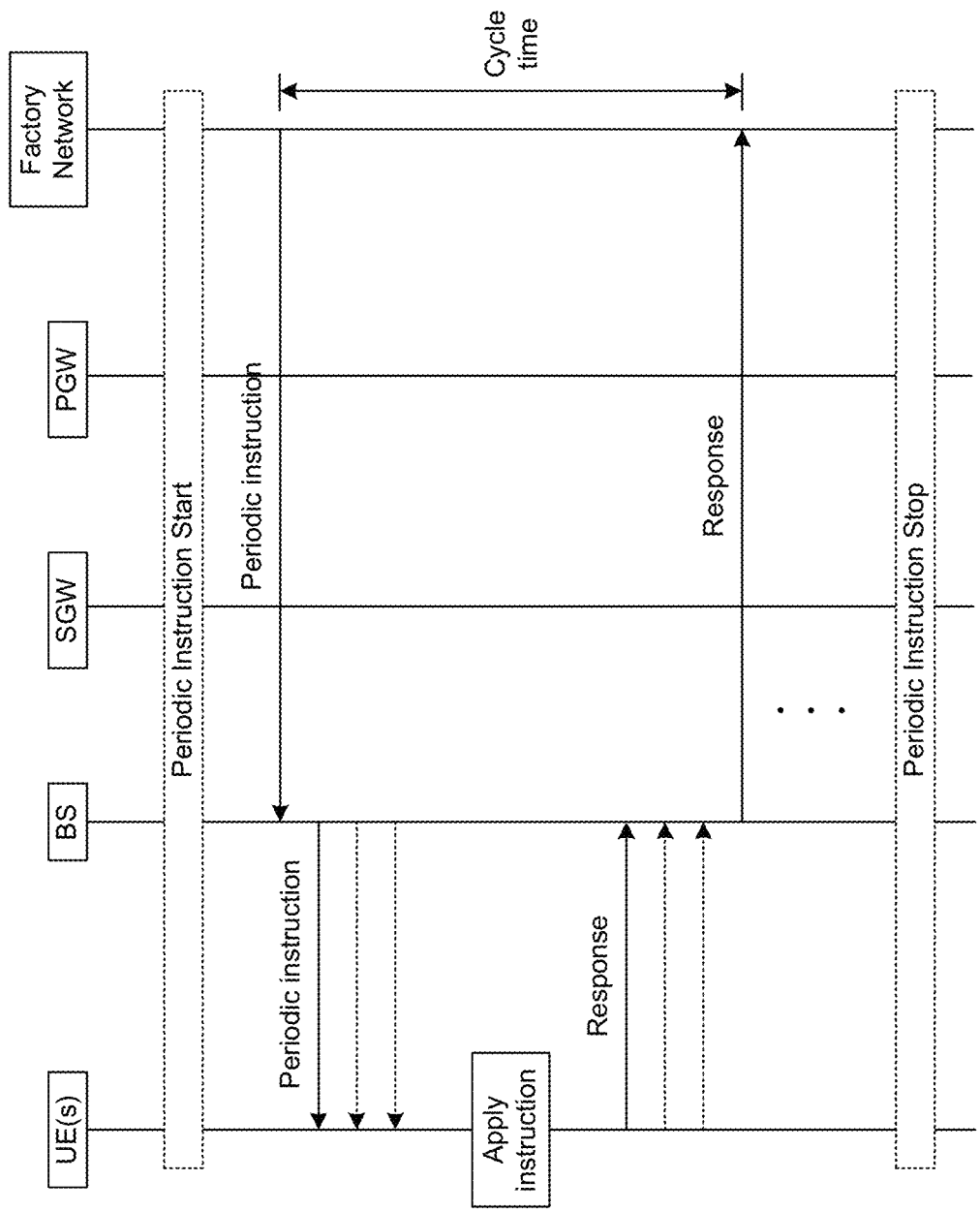
FIG. 8 is a diagram according to one exemplary embodiment.

After performing steps of registration to factory network, the use case of periodic instruction has generally the following steps as shown in FIG. 8:

Periodic instruction transmission—The set of UEs should reliably receive the instruction from the controller based on the received parameters. Other UEs don't need to receive or even wake up. Diversity technique (e.g., repetitions, HARQ (Hybrid Automatic Repeat Request) retransmissions, or etc.) is applied to the transmissions. For example, HARQ retransmission may occur if base station receives any HARQ NACK (Negative Acknowledgement). Only UEs unsuccessfully receiving the instruction need to receive repetition, retransmission, or even wake up.

Apply instruction isochronously—During a cycle time, the set of UEs should apply the received instruction isochronously.

Transmit response(s) of the instruction—The set of UEs should reliably transmit the response(s) to the controller based on the received parameters. Diversity technique (e.g., repetitions, HARQ retransmissions, or etc.) is applied to the responses. For example, HARQ retransmission may occur if a UE receives any HARQ NACK.

In order to achieve periodic transmission and its response within cycle time, a scheduling mechanism is needed to provide radio resources for periodic transmissions from controller and associated responses from UEs within the cycle time.

From the perspective of RAN (Radio Access Network), radio resource scheduling is handled by base station. However, instructions are transmitted from factory network periodically. Radio resource allocation of the base station for the downlink instructions transmission and possibly uplink responses need to be well coordinated with the factory network in order to fulfill the cycle time requirement. To this end, assistance information to help the base station properly configure the UE(s) and provide radio resources to UE(s) to support periodic instruction and/or potential response from the UE(s) needs to be considered.

To solve the problem, a base station (BS) should have knowledge about timing to start a transmission. Information related to time to start a transmission is indicated to the base station. In one embodiment, the transmission includes an instruction. The instruction is transmitted from a core network or a factory network. Furthermore, the base station should have knowledge about timing to start a reception. Information related to time to start a reception is indicated to the base station. In one embodiment, the reception includes a response of the instruction. The response may be higher layer response or application layer response. In one embodiment, the response is transmitted from a UE to the base station.

The information can assist the base station to decide when to start a downlink transmission to UE(s) and provide a configuration to the UE(s) about the downlink transmission. For example, activation time and/or start offset could be used to indicate a UE the time to start downlink reception. If some response to the downlink transmission is needed (e.g., UE information, status report, acknowledgement or negative acknowledgement), the information may also assist the base station to schedule the uplink transmission for the response (e.g., the timing, the message size, the content), and provide a configuration to the UE(s) about the uplink transmission. For example, activation time and/or start offset could be used to indicate a UE the time to start uplink transmission.

A method of a base station is provided. The base station receives information related to time to perform periodic transmissions. The base station may also receive information related to time to perform periodic receptions. Based on the information, the base station provides a UE with configuration(s) indicating a periodic downlink resource allocation and a periodic uplink resource allocation. The periodic downlink resource allocation and the periodic uplink resource allocation may be provided together in the same configuration or provided separately in different configurations.

Figure 9:
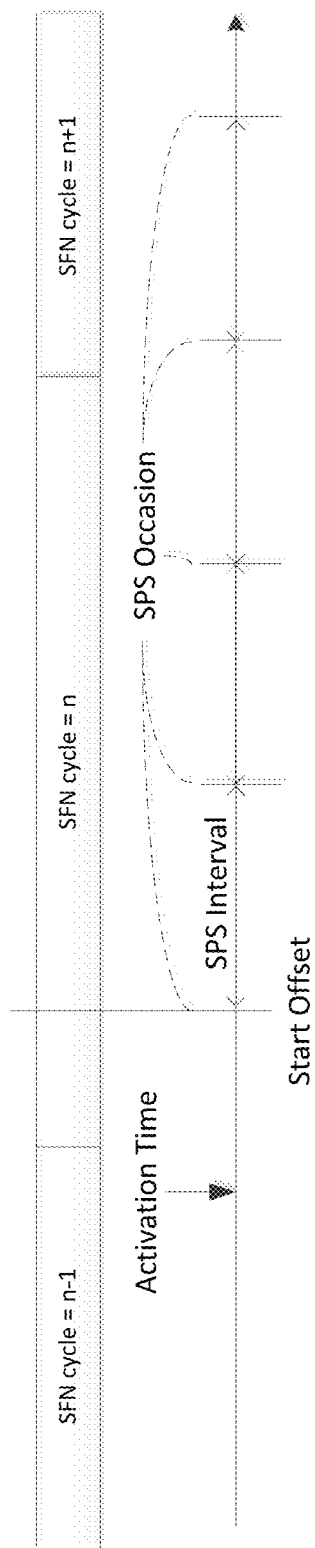
FIG. 9 is a diagram according to one exemplary embodiment.

The activation time and/or start offset may be represented by hyper frame number, frame number, subframe number, or any combination of the above. Alternatively, the activation time and/or start offset may be represented by date, hour, minute, second, millisecond, micro-second, or any combination of the above. The downlink reception and/or uplink transmission may be semi-persistent, like semi-persistent scheduling (SPS) discussed in 3GPP TS 36.321 and TS 36.331, and the activation time and/or start offset may be used to indicate when downlink and/or uplink SPS starts. An example is illustrated in FIG. 9.

In addition, assistance information from factory network to BS to help BS properly configure the UE(s) and provide radio resources to UE(s) to support periodic instruction should be considered. Assistance information from BS to factory network may also be considered. The information may be able to express cycle time limitation and also help BS decide which UE(s) belongs to the same group with the same group identity so that BS can reserve resources for the same group for the periodic transmission, and transmit the instruction at the accurate time.

The following aspects may also be considered:
For downlink direction, same instruction is transmitted to a set of UEs.
For downlink direction, the set of UEs shall start the DL reception isochronously.
For uplink direction, the content of each UE's response can be different.

For uplink direction, UL transmission of each UE may or may not be at the same time.

Based on current 3GPP TS 36.321 and TS 36.331, semi-persistent scheduling (SPS) can be used to schedule the periodic transmission and response. However, using current LTE SPS has the following drawbacks:

Current LTE SPS is per-UE scheduling. To schedule the same instruction transmission to the set of UEs that may have more than one UE in the set, eNB needs to indicate SPS activation via PDCCH (Physical Downlink Control Channel) individually to every UE in the set. Large number of UEs in the set could have negative impact to scheduling complexity and PDCCH capacity.

Figure 10:
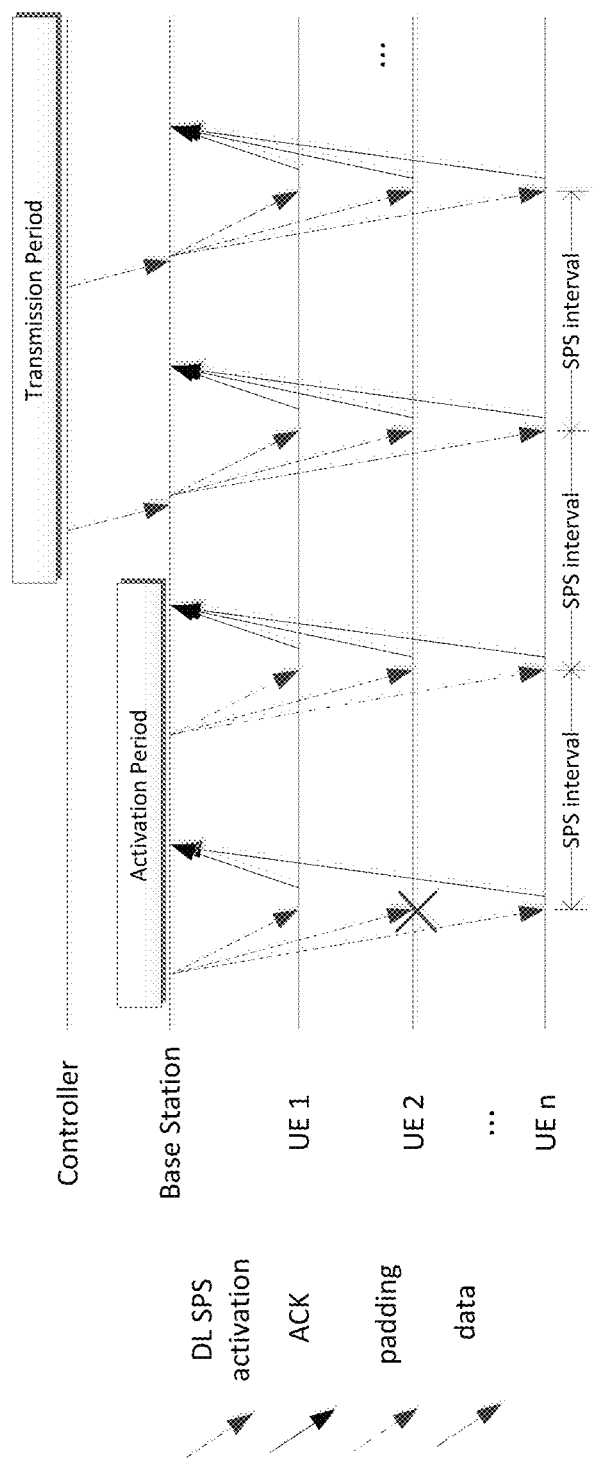
FIG. 10 is a diagram according to one exemplary embodiment.

If the same instruction is to be transmitted to the set of UEs that may have more than one UE in the set, all UEs in the set need to start the DL reception at the same time in order to receive the same instruction. To ensure every UE has received the SPS activation successfully, a period of time before transmitting instruction (e.g., activation period) may be necessary for base station to activate SPS for every UE in the set so that the UE losing the SPS activation signaling can still have time to recover (due to loss rate of lower layer signaling). Besides, in order to align the time of SPS occasion between UEs, SPS activation cannot be retransmitted freely but on the start of every SPS interval, which is an additional restriction for LTE SPS. Extra UE power waste is caused due to earlier SPS activation (wait for other UE to be ready) as illustrated in FIG. 10.

Figure 11:
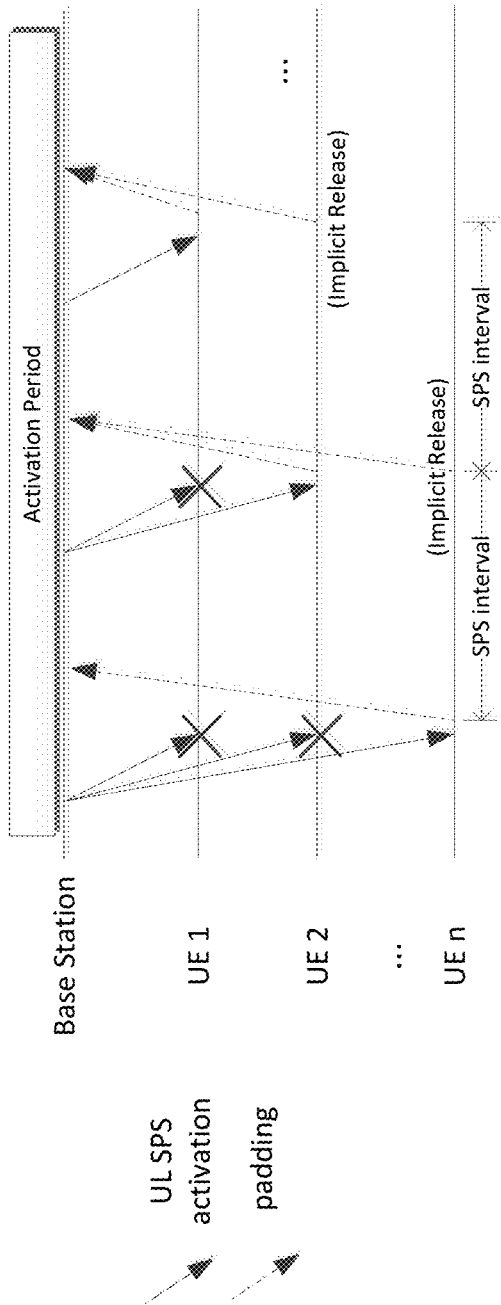
FIG. 11 is a diagram according to one exemplary embodiment.

For current LTE SPS in UL (Uplink), implicit release is mandatory. If activation period mentioned above is needed, the UE which has been activated earlier may not have data for transmission for the first few SPS occasions, and resources for UL SPS may be implicitly released as illustrated in FIG. 11.

To overcome the drawback of current LTE SPS, the following improvements are considered in this invention:

To handle the same instruction transmitted to a set of UEs that may have more than one UE in the set, multicast transmission is utilized for the same downlink instruction. Using multicast can reduce PDCCH resource and scheduling complexity.

Lower layer signaling (e.g., PDCCH signalling) is not used for SPS activation or deactivation. Instead, dedicated RRC signaling is used to indicate the time to start SPS transmission/reception. Every UE in the set can have the same understanding on when to start SPS transmission/reception, and there will be no additional UE power waste due to earlier SPS activation.

The configurations that may be required and dedicatedly configured to a UE are listed as below:

(1) Group RNTI (Radio Network Temporary Identifier)—Group RNTI is used for scrambling of data, if needed. It may be optional.

(2) DL & UL SPS interval—DL SPS interval and UL SPS interval could be common or separate.

(3) Time to start DL reception—To ensure every UE in the set to start DL reception at the same time, the time to start DL reception may need to be indicated. It can be represented by a start offset, activation time, or the combination of them. SPS occasions could be defined by a start offset and an SPS interval. SPS resources may occur at each SPS occasion once they are activated and an additional activation time could be used to indicate the time when the SPS resources will be activated as illustrated in FIG. 9.

Alternatively, the activation time can be replaced by an activation command which may or may not include an activation time. Not including any activation time generally means to activate the SPS configuration immediately. The activation command could be a RRC message. Alternatively, the UE starts to apply SPS resources (including at least a start-offset, periodicity, and radio resources) when the upper layer, such as the application layer, informs the lower layer.

(4) Time to stop DL reception—The information may be optional. Possibly, the factory network may provide the information in which the time to stop periodic instruction is included. Based on the information, BS can inform each UE in the same set about the time to stop DL reception beforehand. With this way, the signalling for each UE in the same set to deactivate DL SPS or release DL SPS resource can be saved significantly. The time to stop periodic instruction can be represented by a duration followed by the start of periodic instruction. The duration may be represented by number of hyper frame, frame, subframe, or any combination of the above. Alternatively, the time to stop periodic instruction may be represented by hyper frame number, frame number, subframe number, or any combination of the above. Alternatively, the time to stop periodic instruction may be represented by date, hour, minute, second, millisecond, micro-second, or any combination of the above.

If the UEs are not informed about the time to stop periodic instruction (i.e., the time to stop periodic instruction is not provided in the required UE dedicated configurations), the UEs may be explicitly informed by BS to deactivate DL SPS or release DL SPS resource via dedicated signalling. Alternatively, the UEs may be explicitly informed by BS to deactivate DL SPS or release DL SPS resource via common signalling addressed to the Group RNTI if provided. More specifically, the signalling could be a lower layer signalling (e.g., PDCCH).

(5) Time to start UL transmission—Time to start UL transmission may not be the same for every UE in the set (e.g., depending on resource scheduling). To indicate the UL timing, the signaling could be a delta value to the DL timing or independent to DL timing (e.g., another activation time and start offset).

(6) Time to stop UL transmission—The information may be optional. Similar to the time to stop DL reception, each UE in the same set may be provided with time to stop UL transmission. The time to stop UL transmission can be represented by a duration followed by the start of periodic instruction or the start of associated response. The duration may be represented by number of hyper frame, frame, subframe, or any combination of the above. Alternatively, the time to stop UL transmission may be represented by hyper frame number, frame number, subframe number, or any combination of the above. Alternatively, the time to stop UL transmission may be represented by date, hour, minute, second, millisecond, micro-second, or any combination of the above.

If the UEs are not informed about the time to stop UL transmission (i.e., the time to stop UL transmission is not provided in the required UE dedicated configurations), the UEs may be explicitly indicated to deactivate UL SPS or release UL SPS resource via dedicated signalling from BS. Alternatively, the UEs may be explicitly indicated by BS to deactivate UL SPS or release UL SPS resource via common signalling addressed to the Group RNTI if provided. Alternatively, the UEs may be implicitly indicated to deactivate UL SPS or release UL SPS resource based on the stop of DL reception. More specifically, the signalling could be a lower layer signalling (e.g., PDCCH).

(7) Resource allocation for DL reception & UL transmission—The resource allocation indicates what resource is used for DL reception and UL transmission. MCS also needs to be indicated. It is assumed that the allocation doesn't change frequently. For DL reception, the resource is the same among the set of UEs. For UL transmission, each UE should have its own resource. It may also be configured via system information, but this information seems not necessary to repeatedly transmitted like system information does.

The information that may be necessary and known by BS is listed as below:

(a) The set of UEs to receive an instruction—Upon receiving an instruction from factory network, BS needs to know the instruction should be sent to which set of UEs. It will be too late (cycle time requirement cannot be met) to configure the set of UEs when BS receives the instruction.

A group ID associated with UE(s) should be indicated to the BS. The UE may be represented by its device ID or temporary ID. If group RNTI is needed, the BS associates the UE with a group for the group ID by mapping the UE ID (e.g., device ID) and/or group ID to a group RNTI. In other words, BS needs to maintain a mapping between a group ID and a group RNTI for a set of UEs.

Furthermore, the group ID may be provided together with each instruction. So BS can understand which set of UEs that an instruction is transmitted to. Possible options for group ID could be a specific ID, an IP address, a port number, or a bearer ID for the group.

(b) Inter-arrival time of instructions—This information can assist BS to decide SPS interval.

(c) Expression of cycle time limitation—This information can assist BS to do the scheduling. DL part and UL part should be separately indicated (such as Dc,n and Da,n). The cycle time requirement may also be represented by QoS (Quality of Service) classes, e.g., QCI (QoS Class Identifier)

(d) Time to start the instruction transmission—This information can assist BS to decide the time to start DL reception for UE(s), such as activation time or start offset. If the UE decides to apply SPS resource based on application layer signaling from factory network, BS does not need to signal the activation time to the UE, but BS still needs to know the time to start the instruction transmission from factory network based on the methods mentioned above in order to reserve SPS resource and transmit the instruction at the correct time.

(e) Size of the instruction/size of the response—This information can assist BS to do the scheduling. Size of response may not be the same for every UE.

Figure 12:
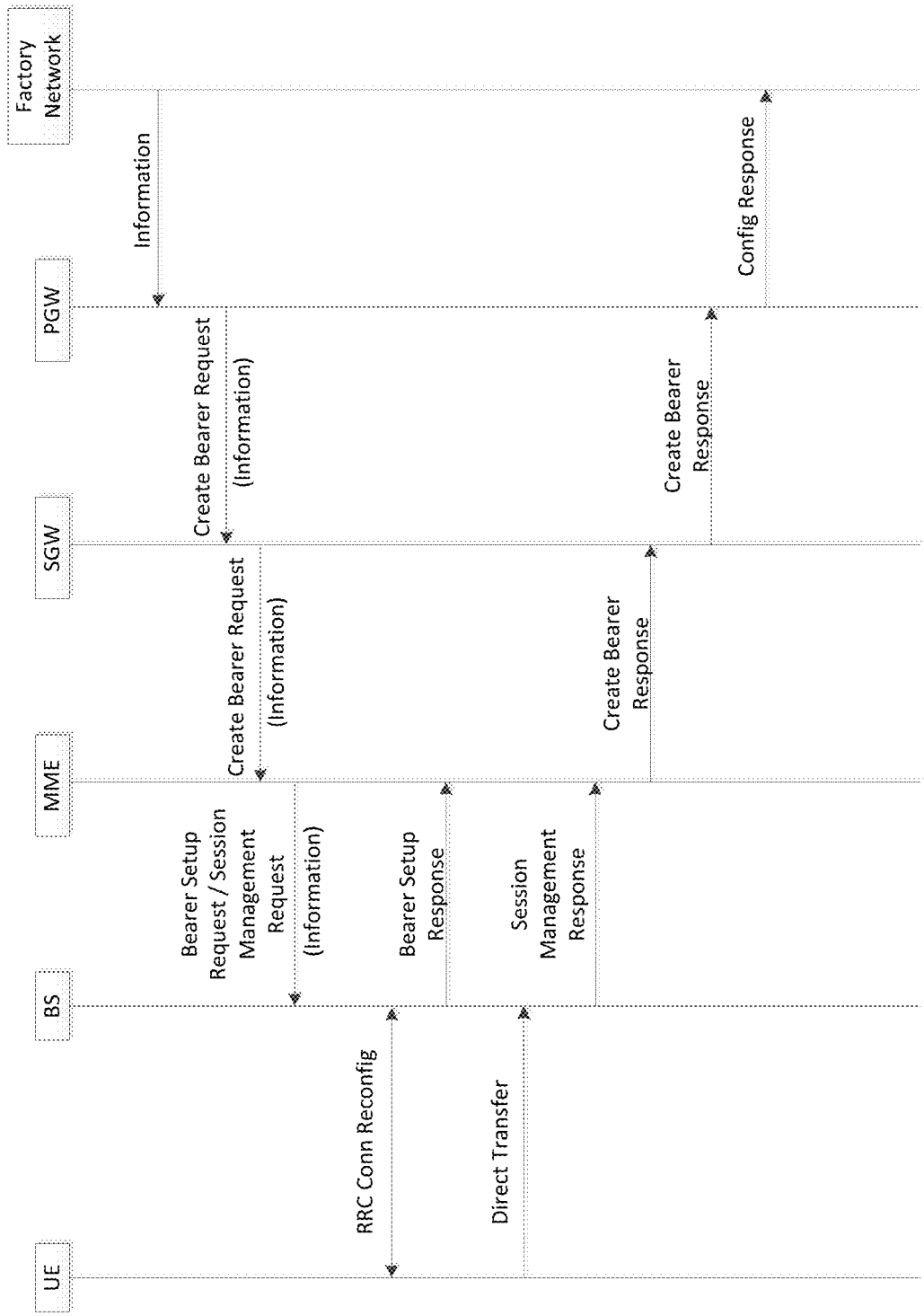
FIG. 12 is a diagram according to one exemplary embodiment.

The information could be provided to the base station from factory network. For example, the information could be provided via a dedicated EPS (Evolved Packet System) bearer activation procedure, as illustrated in FIG. 12. Dedicated EPS bearer activation procedure is specified in Section 5.4.1 of 3GPP TS 23.401. The procedure is triggered by PDN (Packet Data Network) GW (Gateway). In this procedure, the PDN GW sends a Create Bearer Request message, the content of which is then forwarded to BS. In LTE, this message includes IMSI, PTI, EPS Bearer QoS, TFT, S5/S8 TEID, etc. For factory automation, this procedure could be used to provide BS necessary information to configure SPS resources to a UE.

Figure 13:
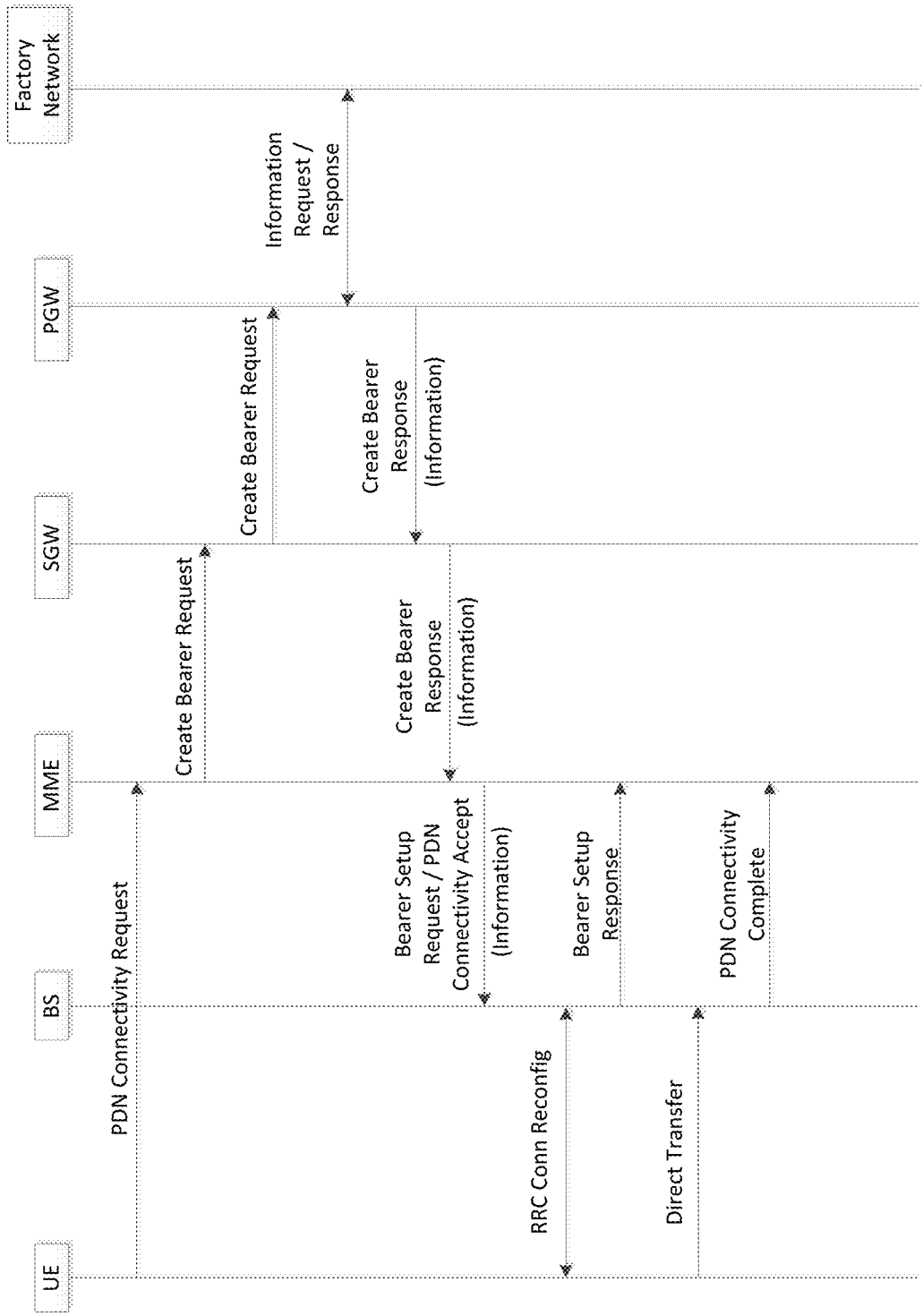
FIG. 13 is a diagram according to one exemplary embodiment.

Alternatively, the information could be indicated via a UE requested PDN connectivity procedure, as illustrated in FIG. 13. UE requested PDN connectivity procedure is specified in Section 5.10.2 of 3GPP TS 23.401. The procedure is triggered by a UE. When a base station receives the necessary information from factory network, it can configure SPS resources to the UE in RRC Connection Reconfiguration procedure which configures default EPS bearer to the UE.

Figure 14:
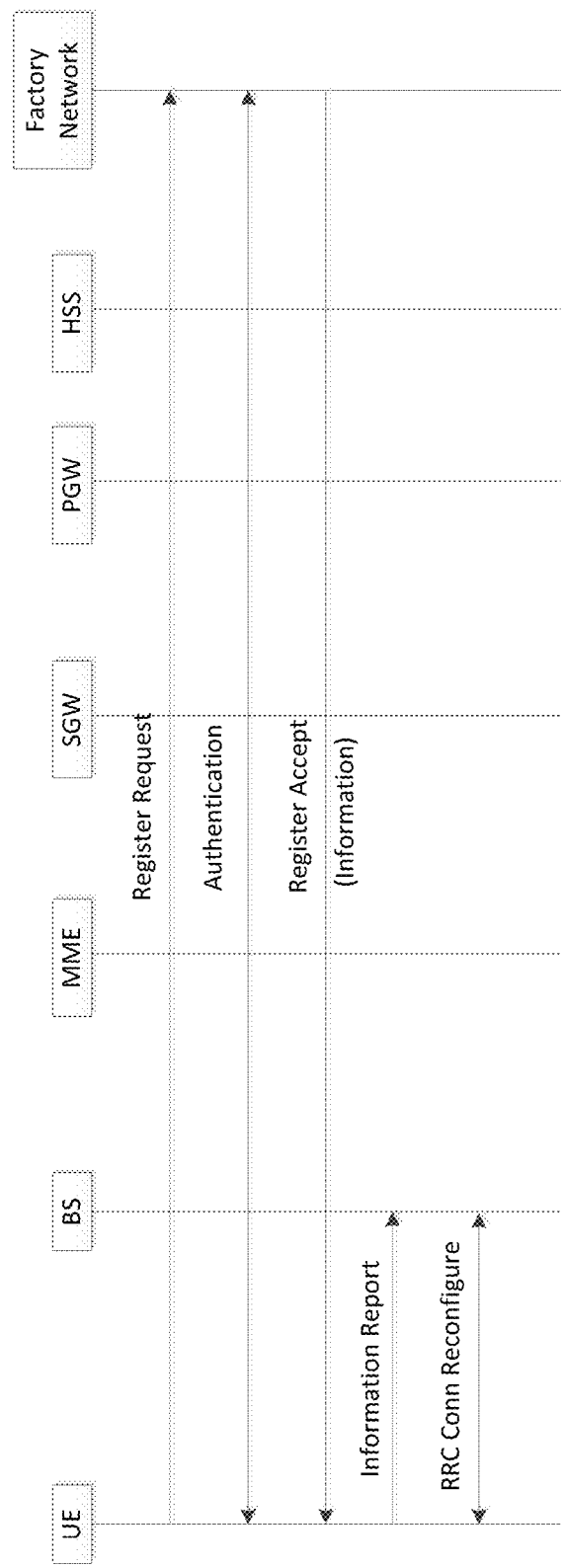
FIG. 14 is a diagram according to one exemplary embodiment.

Alternatively, the information could be indicated to the base station from a UE. For example, the information could be indicated via UE reporting, as illustrated in FIG. 14. The UE may obtain the information via a registration procedure. When a UE is registered to a factory network, the factory network could provide necessary information to the UE. Then the UE reports the information to BS. The BS can configure the UE based on the information.

Alternatively, the information could be indicated to a base station via an interface established between the base station and core network. In one embodiment, the interface could be a S1 interface as defined in legacy LTE (as discussed in 3GPP TS 36.300) and the core network could be a MME (Mobile Management Entity), a serving gateway, or a PDN gateway.

Figure 15:
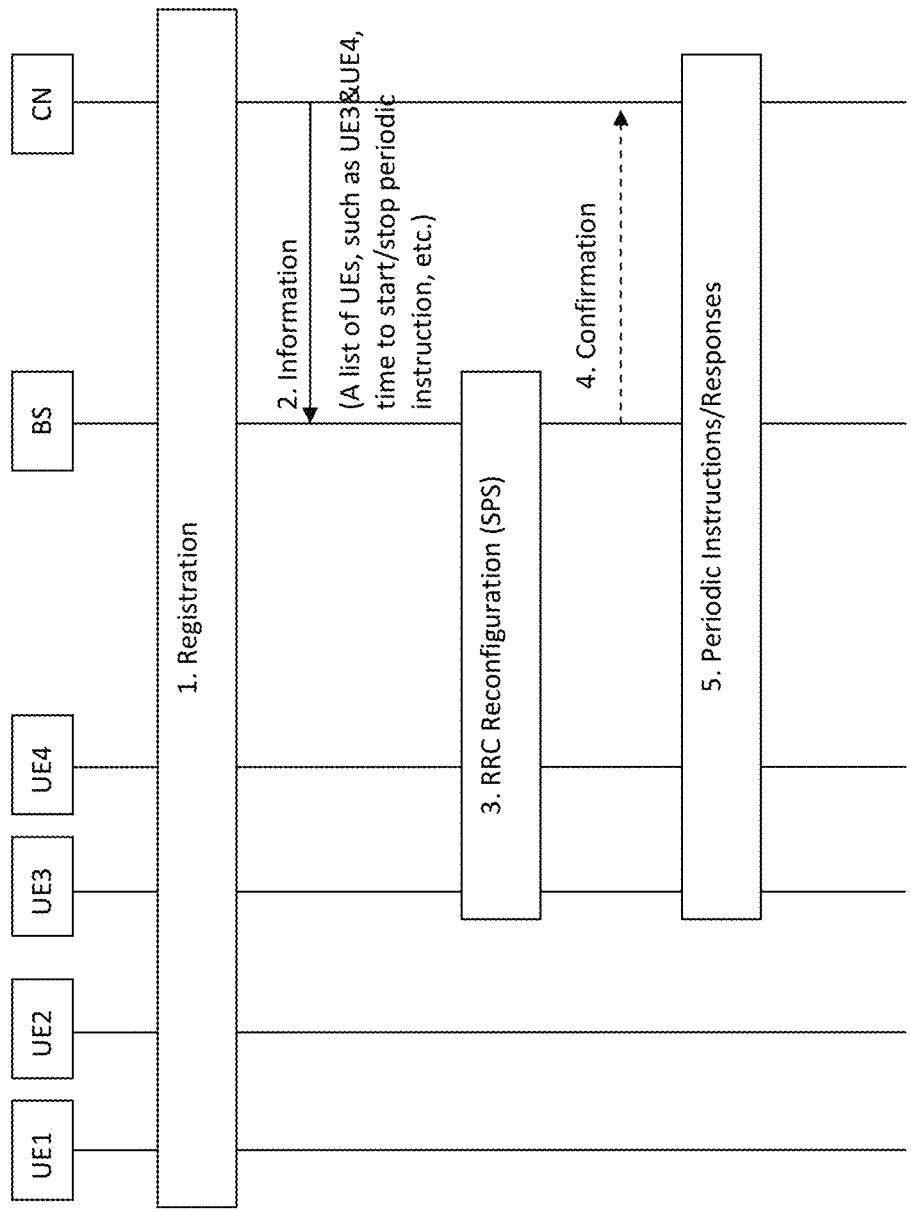
FIG. 15 is a diagram according to one exemplary embodiment.

In another embodiment, the interface could be a specific interface established between the base station and the core network which is a factory network or other network node/entity. In this alternative, the information may indicate all UEs belonging to the same group. In addition, the information could indicate all UEs of the same group by including all identities of all UEs in the group. Furthermore, the identity of each UE in the same group could be allocated/configured/assigned to the UE by the MME, the serving gateway, the PDN gateway, the factory network, or other network node/entity. An example of service flow for this alternative could be illustrated in FIG. 15 and generally described below:

Step 1. Each UE could perform registration procedure to the factory network.

Step 2. After each UE has completed the registration procedure individually, the base station could receive the information in which at least a list of UEs (e.g., UE3 and UE4) associated with a group is included.

Step 3. Based on the received information, the base station could configure the UE3 and UE4 with common DL SPS configuration for the UE3 and the UE4 to receive periodic instructions since the UE3 and the UE4 are belonging to the group.

Step 4. After the RRC (Radio Resource Control) reconfigurations for the UE3 and UE4 are completed, the base station may inform the core network that RAN is ready for forwarding periodic instructions. This step could be not essential.

Step 5. The base station multicasts any received periodic instruction associated with the group at specific occasion according to the common DL SPS configuration. When the base station is performing the multicast transmission, it does not transmit downlink control signalling (e.g., PDCCH) to inform all UEs in the group to receive the periodic instructions.

Figure 16:
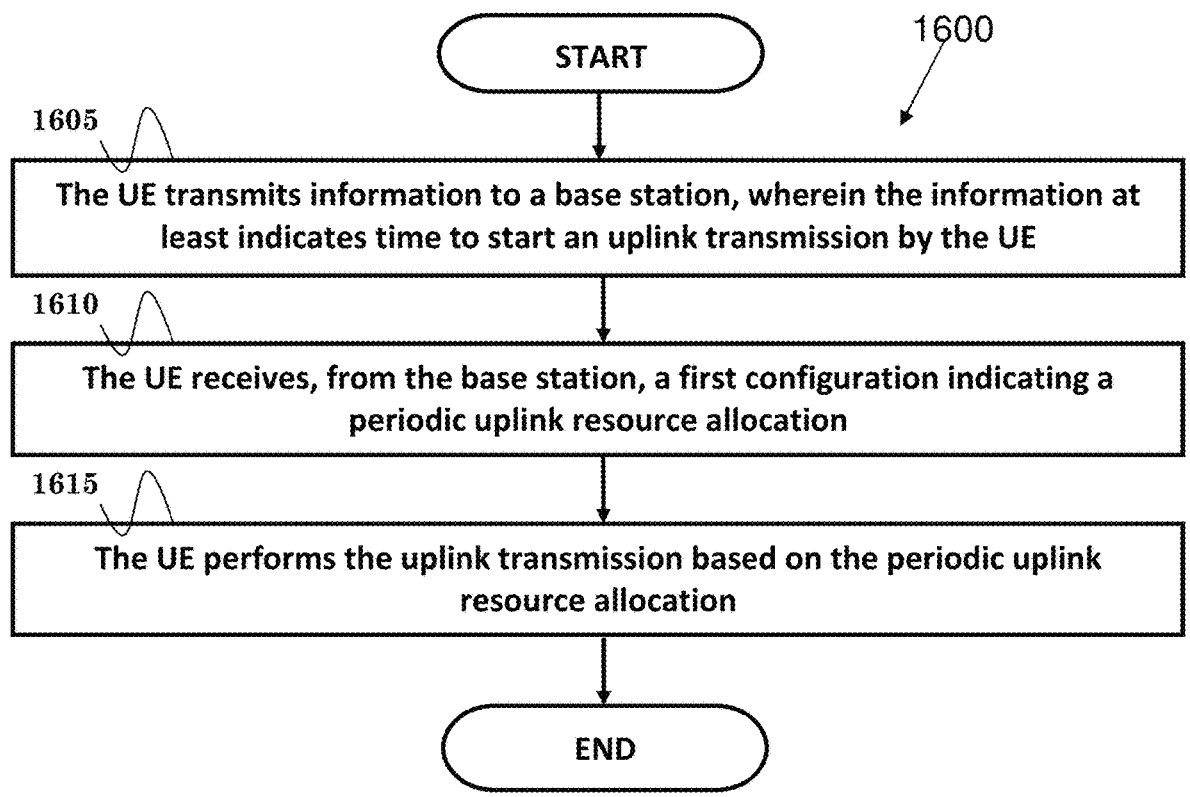
FIG. 16 is a flow chart according to one exemplary embodiment.

FIG. 16 is a flow chart 1600 according to one exemplary embodiment from the perspective of a UE. In step 1605, the UE transmits information to a base station, wherein the information at least indicates time to start an uplink transmission by the UE. In one embodiment, the UE performs the uplink transmission periodically. The information could indicate or include the interval of the uplink transmission. The information could indicate or include the message size of the uplink transmission.

In one embodiment, the UE could receive, from the base station, a first configuration indicating a periodic uplink resource allocation as shown in step 1610. The UE could receive, from the base station, a second configuration indicating periodic uplink transmission interval, e.g. UL SPS interval. The first configuration and/or the second configuration may be based on the information. Furthermore, the UE could perform the uplink transmission based on the periodic uplink resource allocation as shown in step 1615.

Referring back to FIGS. 3 and 4, in one exemplary embodiment of a UE, the device 300 includes a program code 312 stored in the memory 310. The CPU 308 could execute program code 312 to enable the UE to transmit information to a base station, wherein the information at least indicates time to start an uplink transmission by the UE. In one embodiment, the CPU could further execute program code 312 to enable the UE (i) to receive, from the base station, a first configuration indicating a periodic uplink resource allocation, (ii) to receive, from the base station, a second configuration indicating a periodic uplink transmission interval, and/or (iii) to perform the uplink transmission based on the periodic uplink resource allocation. Furthermore, the CPU 308 can execute the program code 312 to perform all of the above-described actions and steps or others described herein.

Figure 17:
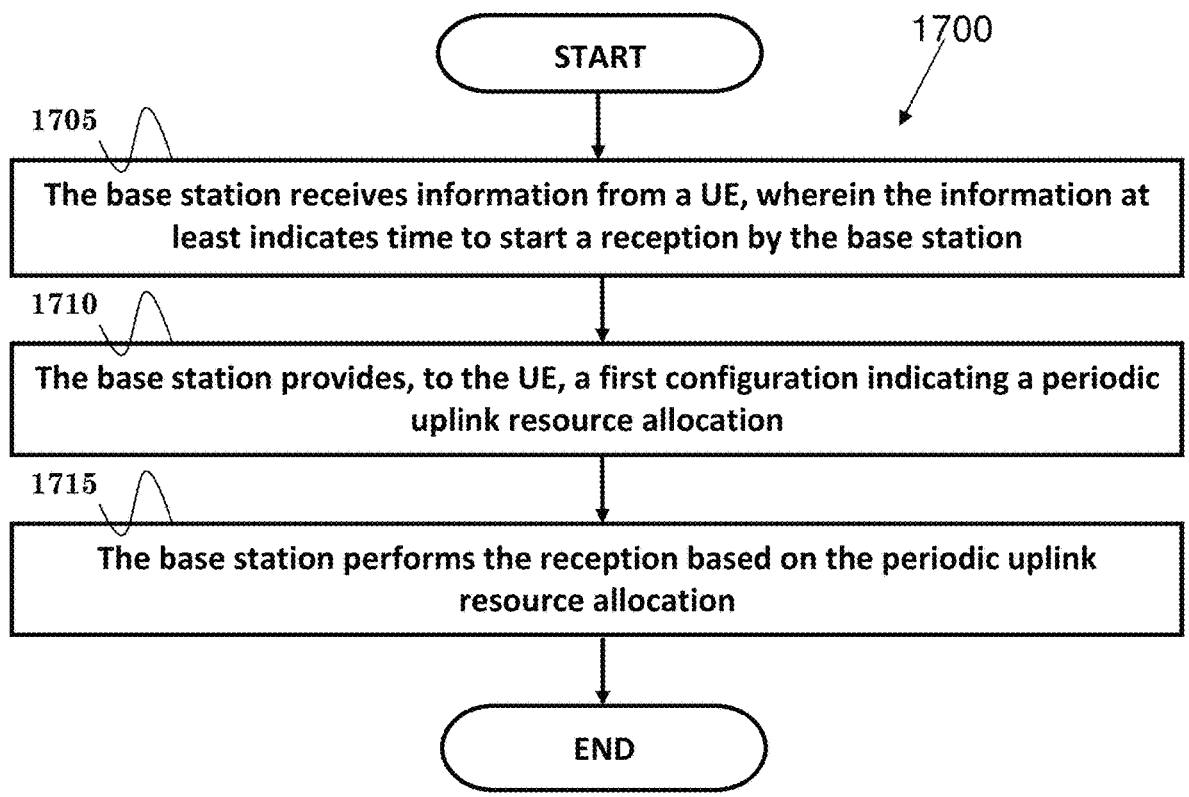
FIG. 17 is a flow chart according to one exemplary embodiment.

FIG. 17 is a flow chart 1700 according to one exemplary embodiment from the perspective of a base station. In step 1705, the base station receives information from a UE (User Equipment), wherein the information at least indicates time to start a reception by the base station. In one embodiment, the base station performs the reception periodically. The information could indicate or include the interval of the reception. Furthermore, the information could indicate or include the message size of the reception.

In one embodiment, the base station could provide, to the UE, a first configuration indicating a periodic uplink resource allocation as shown in step 1710. The base station could provide, to the UE, a second configuration indicating periodic uplink transmission interval, e.g. UL SPS interval. The first configuration and/or the second configuration may be based on the information. Furthermore, the base station could perform the reception based on the periodic uplink resource allocation as shown in step 1715.

Referring back to FIGS. 3 and 4, in one exemplary embodiment of a base station, the device 300 includes a program code 312 stored in the memory 310. The CPU 308 could execute program code 312 to enable the base station to receive information from a UE, wherein the information at least indicates time to start a reception by the base station. In one embodiment, the CPU could further execute program code 312 to enable the base station (i) to provide, to the UE, a first configuration indicating a periodic uplink resource allocation, (ii) to provide a second configuration indicating periodic uplink transmission interval, and/or (iii) to perform the reception based on the periodic uplink resource allocation. Furthermore, the CPU 308 can execute the program code 312 to perform all of the above-described actions and steps or others described herein.

Figure 18:
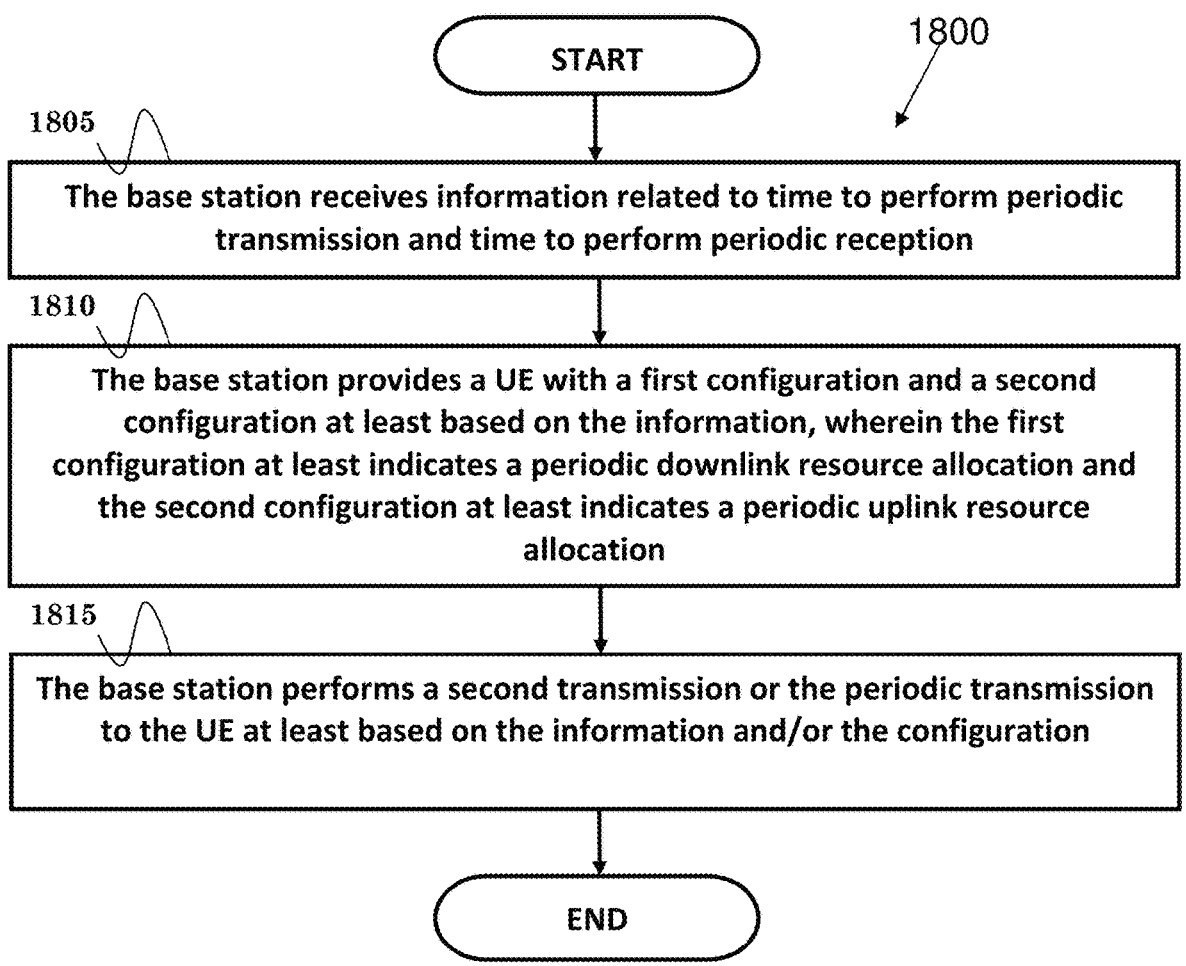
FIG. 18 is a flow chart according to one exemplary embodiment.

FIG. 18 is a flow chart 1800 according to one exemplary embodiment from the perspective of a base station. In step 1805, the base station receives information related to time to perform periodic transmission and time to perform periodic reception. In step 1810, the base station provides a UE with a first configuration and a second configuration at least based on the information, wherein the first configuration at least indicates a periodic downlink resource allocation and the second configuration at least indicates a periodic uplink resource allocation.

In one embodiment, the base station could perform a second transmission or the periodic transmission to the UE at least based on the information and/or the configuration as shown in step 1815.

Referring back to FIGS. 3 and 4, in one exemplary embodiment of a base station, the device 300 includes a program code 312 stored in the memory 310. The CPU 308 could execute program code 312 to enable the base station (i) to receive information related to time to perform periodic transmission and time to perform periodic reception, and (ii) to provide a UE with a first configuration and a second configuration at least based on the information, wherein the first configuration at least indicates a periodic downlink resource allocation and the second configuration at least indicates a periodic uplink resource allocation.

In one embodiment, the CPU could further execute program code 312 to enable the base station to perform a second transmission or the periodic transmission to the UE at least based on the information and/or the configuration. Furthermore, the CPU 308 can execute the program code 312 to perform all of the above-described actions and steps or others described herein.

In one embodiment, the first configuration could be the same as the second configuration. Alternatively, the first configuration could be different from the second configuration.

In one embodiment, the periodic transmission could be from a core network or a factory network to the base station. The periodic transmission could be from the base station to the UE. Furthermore, the periodic transmission could include an instruction from the core network or the factory network. The base station allocates downlink resource for the second transmission or the periodic transmission based on the information. In addition, the periodic reception could include a response from the UE.

In one embodiment, the information could indicate or include (i) when a very first transmission of the periodical transmission will start, (ii) the interval of the periodic transmission, (iii) when a very first reception of the periodic reception will start, (iv) the interval of the periodic reception, and/or (v) an identity of the UE or a group to which the UE belongs.

In one embodiment, the base station could receive the information from a core network node, a factory network node, and/or the UE. The base station could receive the information via a dedicated EPS bearer activation procedure, UE requested PDN connectivity procedure, and/or UE reporting. The base station could receive the information in a bearer setup request, a session management request, and/or a PDN connectivity accept. The UE could receive the information via a registration procedure.

In one embodiment, the base station provides a time to apply the downlink and/or uplink resource to the UE. Furthermore, the time to apply the downlink and/or uplink resource could be included in the configuration or in a second configuration different from the configuration. In addition, the base station could provide the configuration or the second configuration to the UE in a RRC (Radio Resource Control) connection reconfiguration message.

In one embodiment, based on the information, the base station could decide (i) the content of the configuration, (ii) the content of the downlink and/or uplink resource, (iii) the timing of the downlink and/or uplink resource, (iv) the size of the downlink and/or uplink resource, and/or (v) when to provide the configuration.

In one embodiment, the configuration could indicate or include (i) a downlink and/or uplink semi-persistent scheduling configuration, and/or (ii) an activation time and/or a start offset. Furthermore, the activation time and/or the start offset could be used for downlink and/or uplink. The activation time and/or the start offset could be represented by hyper frame number, frame number, and/or subframe number. In one embodiment, the activation time and/or the start offset could be represented by date, hour, minute, second, millisecond, and/or micro-second.

In one embodiment, the UE could be a mobile station and/or an advanced mobile station. The base station could be an eNB, an advanced eNB, and/or an access point. The core network node could be a MME, a serving gateway, and/or a PDN gateway. The factory network node could be a controller, a master, and/or a server.

Based on the invention, a base station can properly schedule radio resources for downlink and/or uplink transmission and configure a UE to receive downlink transmission for instruction from factory network, and transmit potential uplink response.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a UE (User Equipment) in a wireless communication system, comprising:

the UE transmits information to a base station, wherein the information at least indicates time to start a very first transmission of periodic uplink transmission by the UE;

the UE receives, from the base station, a first configuration indicating a periodic uplink resource allocation in response to the information;

the UE receives, from the base station, a second configuration indicating a periodic uplink transmission interval in response to the information; and the UE performs the periodic uplink transmission based on the periodic uplink resource allocation and the periodic uplink transmission interval.

2. The method of claim 1, wherein the information indicates the periodic uplink transmission interval.

3. The method of claim 1, wherein the information indicates message size of the periodic uplink transmission.

4. The method of claim 1, wherein the second configuration indicates time to start the periodic uplink transmission.

5. The method of claim 1, wherein the second configuration is carried by a dedicated Radio Resource Control (RRC) signaling.

6. A method for a base station in a wireless communication system, comprising:

the base station receives information from a UE (User Equipment), wherein the information at least indicates time to start a very first reception of periodic reception by the base station;

the base station provides a first configuration indicating a periodic uplink resource allocation to the UE in response to the information;

the base station provides a second configuration indicating a periodic uplink transmission interval to the UE in response to the information; and the base station performs the periodic reception based on the periodic uplink resource allocation and the periodic uplink transmission interval.

7. The method of claim 6, wherein the information indicates the periodic uplink transmission interval.

8. The method of claim 6, wherein the information indicates message size of the periodic reception.

9. The method of claim 6, wherein the second configuration indicates time to start a periodic uplink transmission by the UE.

10. The method of claim 6, wherein the second configuration is carried by a dedicated Radio Resource Control (RRC) signaling.

11. A User Equipment (UE), comprising:
a control circuit;
a processor installed in the control circuit; and
a memory installed in the control circuit and operatively coupled to the processor;
wherein the processor is configured to execute a program code stored in the memory to:

transmit information to a base station, wherein the information at least indicates time to start a very first transmission of periodic uplink transmission by the UE;

receive, from the base station, a first configuration indicating a periodic uplink resource allocation in response to the information;

receive, from the base station, a second configuration indicating a periodic uplink transmission interval in response to the information; and perform the periodic uplink transmission based on the periodic uplink resource allocation and the periodic uplink transmission interval.

12. The UE of claim 11, wherein the information indicates the periodic uplink transmission interval.

13. The UE of claim 11, wherein the information indicates message size of the periodic uplink transmission.

14. The UE of claim 11, wherein the second configuration indicates time to start the periodic uplink transmission.

15. The UE of claim 11, wherein the second configuration is carried by a dedicated Radio Resource Control (RRC) signaling.

16. A base station, comprising:
a control circuit;
a processor installed in the control circuit; and
a memory installed in the control circuit and operatively coupled to the processor;
wherein the processor is configured to execute a program code stored in the memory to:

receive information from a UE (User Equipment), wherein the information at least indicates time to start a very first reception of periodic reception by the base station;

provide a first configuration indicating a periodic uplink resource allocation to the UE in response to the information;

provide a second configuration indicating a periodic uplink transmission interval to the UE in response to the information; and perform the periodic reception based on the periodic uplink resource allocation and the periodic uplink transmission interval.

17. The base station of claim 16, wherein the information indicates the periodic uplink transmission interval.

18. The base station of claim 16, wherein the information indicates message size of the periodic reception.

19. The base station of claim 16, wherein the second configuration indicates time to start a periodic uplink transmission by the UE.

20. The base station of claim 16, wherein the second configuration is carried by a dedicated Radio Resource Control (RRC) signaling.

* * * * *